(12) United States Patent
Chu et al.

(10) Patent No.: US 6,441,964 B1
(45) Date of Patent: Aug. 27, 2002

(54) ANTI-REFLECTION HIGH CONDUCTIVITY MULTI-LAYER COATING FOR FLAT CRT PRODUCTS

(75) Inventors: Jau-Jier Chu; Chao-Sung Li; Cheng Chen Shih; Shao Chi Chang, all of Science Based Industrial Park Hsinchu (TW)

(73) Assignee: Applied Vacuum Coating Technologies Co., Ltd., Hsinchu (TW)

( * ) Notice: Subject to any disclaimer, the term of this patent is extended or adjusted under 35 U.S.C. 154(b) by 59 days.

(21) Appl. No.: 09/756,724

(22) Filed: Jan. 10, 2001

(51) Int. Cl.[7] .............................. G02B 1/11; G02B 5/28; H01J 1/70
(52) U.S. Cl. .................. 359/585; 359/586; 359/588; 359/589; 359/614; 428/216; 313/112; 313/479
(58) Field of Search .................................. 359/585, 586, 359/588, 589, 580, 601, 614; 428/216; 313/112, 479

(56) References Cited

U.S. PATENT DOCUMENTS

| | | | | |
|---|---|---|---|---|
| 4,921,760 A | * | 5/1990 | Tani et al. ................ 428/446 |
| 4,945,282 A | * | 7/1990 | Kawamura et al. ......... 313/479 |
| 5,091,244 A | * | 2/1992 | Biornard .................. 428/216 |
| 5,105,310 A | * | 4/1992 | Dickey .................... 359/586 |
| 5,147,125 A | * | 9/1992 | Austin ..................... 359/359 |
| 5,170,291 A | * | 12/1992 | Szczyrbowski et al. .... 359/580 |
| 5,216,542 A | * | 6/1993 | Szczyrbowski et al. .... 359/588 |
| 5,362,552 A | * | 11/1994 | Austin ..................... 428/216 |
| 5,407,733 A | * | 4/1995 | Bjornard et al. .......... 428/216 |
| 5,541,770 A | * | 7/1996 | Pellicori et al. .......... 359/585 |
| 5,579,162 A | * | 11/1996 | Bjornard et al. .......... 359/580 |
| 5,728,426 A | * | 3/1998 | Adair et al. ............. 428/216 |
| 5,783,049 A | * | 7/1998 | Bright et al. ........... 204/192.14 |
| 5,976,684 A | * | 11/1999 | Oyama et al. ............ 428/216 |

\* cited by examiner

*Primary Examiner*—Jon Henry
(74) *Attorney, Agent, or Firm*—Rosenberg, Klein & Lee

(57) ABSTRACT

An anti-reflection with high conductivity and transmission controlled multi-layer coating for Flat CRT products is provided which includes five layers coating by vacuum sputtering and one layer coating by conventional wet process. The first layer is formed by an oxide material. The second layer is arranged on an underlying first layer and is formed by a metal. The third layer is arranged on an underlying second layer and is coated by vacuum sputtering. The third layer provides high conductivity thin film with resistance as low as $10^2$ Ω/square. The fourth layer is arranged on an underlying third layer and is formed by an oxide material. The fifth layer is formed by an oxide material. The fourth layer and fifth layer are coated by vacuum sputtering. The sixth layer is deposited on the top surface and is formed by a wet silica coating process.

11 Claims, 3 Drawing Sheets

ANTI-REFLECTION HIGH CONDUCTIVITY MULTI-LAYER COATING FOR FLAT CRT PRODUCTS

FIELD OF THE INVENTION

The present invention relates to a coating process composed of an optically effective layer system, for CRT glass substrate, whereby the layer system has a high anti-reflection, low resistivity, and light-attenuation effect. More specifically the invention relates to a combination of vacuum sputtering process which produce high conductivity of oxide films and a wet process which produce silica overcoat from traditional spin or spray coating.

BACKGROUND OF THE INVENTION

U.S. Pat. No. 4,945,282 discloses an image display panel having anti-static film with transparent and electron-conductive properties and process for processing the same. The layer system includes $SnO_2$, $In_2O_3$, $Sb_2O_3$, and $SiO_2$. All thin films of the layer system are produce by wet chemical process. There are 2 layers in the layer system. For a given example, the total thickness of the 2-layer structure was up to 2000 angstroms. The materials and thickness of the two films are antistatic coat ($SnO_2$, $In_2O_3$, $Sb_2O_3$), 50–800 angstroms and $SiO_2$, 1000±200 angstroms respectively.

U.S. Pat. NO. 5,976,684 disclosed is an organic substrate provided with a light absorptive antireflection film and process for its production. The layer system included an organic substrate with acrylic hard coat layer, SiN, TiN and $SiO_2$. The thin films of the SiN, TiN and $SiO_2$ layer are produced by vacuum sputtering process. There are 3 to 4 thin layers in the layer system. For a given example, the total thickness of the 4 layer structure was about 1000 angstroms. The materials and thickness of the two most thicker films of the 4 layer structure are TiN, 20–200 angstroms and $SiO_2$, 600–1100 angstroms, respectively.

U.S. Pat. No. 4,921,760 disclosed is an multi-layer anti-reflection coating with excellent adhesion between $CeO_2$ layer and synthetic resin. The layer system includes $CeO_2$, $Al_2O_3$, $ZrO_2$, $SiO_2$, $TiO_2$ and $Ta_2O_5$. All the thin films of the layer system are produced by vacuum evaporation or sputtering process. There are 3 to 5 thin layers in the layer system. For a given example, the total thickness of the 5 layer structure was about 3580 angstroms. The materials and thickness of the two most thicker films of the 5 layer structure are $CeO_2$, 1360 angstroms and $SiO_2$, 1220 angstroms respectively.

U.S. Pat. No. 5,105,310 disclosed a multi-layer anti-reflection coating designed for deposition in in-line coating marching by reactive sputtering. The layer system included $TiO_2$, $SiO_2$, ZnO, $ZrO_2$ and $Ta_2O_5$. All the thin films of the layer system are produced from vacuum evaporation or sputtering process. There are 4 to 6 thin layers in the layer system. For a given example, the total thickness of the 6 layer structure was about 4700 Angstroms. The materials and thickness of two most thicker film of the layer system are ZnO, 1370 Angstroms and $SiO_2$, 1360 Angstroms respectively.

U.S. Pat. Nos. 5,091,244 and 5,407,733 disclosed a new electric conductive light-attenuating anti-reflection coating. The major claim is an article comprising nitrides of certain transition metal to provided an electrically-conductive, light-attenuating, anti-reflection surfaces. The layer systems including TiN, NbN, $SnO_2$, $SiO_2$, $Al_2O_3$, and $Nb_2O_5$. The thin films of the layer system are nitride and oxide materials. There are 3 to 4 thin layers in the layer system. For a given example, the total thickness of the 4 layer structure was about 1610 Angstroms. The materials and thickness of the two most thicker films of the layer system are ZnO, 650 Angstroms and $SiO_2$, 820 Angstroms, respectively. The transmission of visible light of these two layer systems is below 50%. All the thin films of the layer system are produced by vacuum evaporation or sputtering process.

U.S. Pat. No. 5,147,125 disclosed a multi-layer, anti-reflection coating using zinc oxide to provide UV rejection for wave-lengths shorter than 380 nm. The layer system includes $TiO_2$, $SiO_2$, ZnO, and $MgF_2$. All the thin films of the layer system are produced from vacuum evaporation or sputtering process. There are 4 to 6 thin layers in the layer system. For a given example, the total thickness of the 5 layer structure was about. 7350 Angstroms. The materials and thickness of the two major films of the layer system are ZnO, 4390 Angstroms and $MgF_2$, 1320 Angstroms, respectively. All the thin films of the layer system are produced by vacuum evaporation or sputtering process.

U.S. Pat. No. 5,170,291 disclose a 4 layer system which is optical effective and has a high anti-reflective effect. The layers can be formed by either a pyrolytic method, a plasma-supported chemical vapor deposition method, a sputtering method or a chemical deposition method. The layer system includes $SiO_2$, $TiO_2$, $Al_2O_3$, ZnS, MgO and $Bi_2O_3$ For a given sample, the total thickness of the 4 layer structure was about 2480 Angstroms. The materials and thickness of the two major films of the layer system are $TiO_2$, 1040 Angstroms and $SiO_2$, 940 Angstroms, Respectively.

U.S. Pat. No. 5,216,542 disclosed a 5 layer coating with high anti-reflection effect. The process uses an adhesive layer of Ni, Cr or NiCr metal with a thickness about 1 nm (manometer). Other four layers are composed of $SnO_2$, $ZrO_2$, ZnO, $Ta_2O_5$, NiO, $CrO_2$, $TiO_2$, $Sb_2O_3$, $In_2O_3$, $Al_2O_3$, $SiO_2$, TiN and ZrN. For a given example, the total thickness of the 5 layer structure was about 2337 angstroms. The materials and thickness of the two majority films of the layer system are $TiO_2$, 500 Angstroms and $SiO_2$, 1387 Angstroms, respectively. The transmission of visible light of this layer system is below 30%. All the thin films of the layer system are produced by vacuum evaporation or sputtering process.

U.S. Pat. No. 5,541,770 disclosed a light attenuating anti-reflection coating including electrically conductive layers. It is a four or five layer system. A light absorption high refractive index metal such as Cr, Mo and W was used as an optically effective thin film in the layer system. The other three or four layers are $TiO_2$, ITO, $Al_2O_3$, $SiO_2$ and TiN. The patent shows that the majority materials of the layer system are oxide and nitride, only one metal film was used as an optical effective thin film in the anti-reflection coating. All the thin films of the layer system are produced by vacuum evaporation or sputtering process. For a given example, the total thickness of the 5 layer structure was about 1495 angstroms. The materials and thickness of the majority films of the layer system are ITO, 334 Angstroms and $SiO_2$, 720 Angstroms. The transmission of visible light of this layer system is below 60%.

U.S. Pat. No. 5,362,552 disclosed a 6-layer anti-reflection coating including three layers of electrically- conductive metal oxide. The layer system includes $SiO_2$, ITO, $Nb_2O_5$, and $Ta_2O_5$. Up to a total optical thickness of about one-wavelength of visible light of the electrically conductive metal oxide may be included in the coating. For one of given example of 6 layer structure, the materials and thickness of the majority two layers within this 6 layer system are $SiO_2$, 854 Angstroms and ITO 1975 Angstroms. All the thin films of the layer system are produced by vacuum evaporation or sputtering process.

U.S. Pat. No. 5,579,162 disclosed a 4-layer anti-reflection coating for a temperature sensitive substrate such as plastic. One layer is a DC reactively sputtered metal oxide which may be deposited quickly and without imparting a large amount of heat to the substrate. The layer system including $SnO_2$, $SiO_2$ and ITO. For one of given example of the 4 layer structure, the materials and thickness of the majority two layers within this system are $SnO_2$, 763 Angstroms and $SiO_2$ 940 Angstroms. All the thin films of the layer system are produced by vacuum evaporation or sputtering process.

U.S. Pat. Nos. 5,728,456 and 5,783,049 discloses an improved way to deposit anti-reflection coating on plastic film. The multi-layer thin films was coated by a roller coated with vacuum sputtering process. The layer system includes ITO, $SiO_2$, and a thin lubricating over layer which is a solvent-soluble fluoro-polymer. For a given example, the total thickness of the 6 layer system was about 2630 Angstrom. The materials and thickness of the two major film of the layer system are ITO, 888 Angstrom and $SiO_2$, 869 Angstrom.

The above description shows clearly that all the films of a layer system with high anti-reflection, anti-static, and capable of freely controlling transmission effect were produced by wet chemical coating, vacuum evaporation and/or sputtering process. On the other hand, the thickness of the major layer of high refractive index materials in the layer system was between about 700 to 2000 angstrom and the thickness of the major layer of low refractive index materials in the layer system was between about 700 to 1400 angstrom.

SUMMARY OF THE INVENTION

An object of the present invention is to provide an anti-static coating by sputtering process and an anti-reflection coating by wet chemical process such as spin coating, spray coating and etc. for Flat display application.

The process of manufacturing transparent conductive oxide thin film in volume production was highly reliable and was routinely necessary in the industries such as semiconductor, display, architecture glass and plastic web coating for a long time. Because of the low resistance and high transparent, conductive oxide thin film was easy to deposit by sputtering process than wet process (either in process of spin coating or spray coating). The present invention provides a anti-static and anti-reflection coating with a light absorption layer in a combination system of vacuum sputtering and wet coating process.

It is well known that the coating of conductive oxide materials such as $SnO_2$, ZnO, $In_2O_3$, $SnO_2$:F, $SnO_2$:Sb, $In_2O_3$:Sn, ZnO:Al, $Cd_2SnO_4$, $In_2O_3$—ZnO, $SnO_2$-ZnO, $In_2O_3$-MgO, etc. is quite high cost, low performance (high resistance), and low utilization (about 3~5% of chemical solution) from wet coating process. A roughly estimation shows that for a conventional wet coating system of CRT surface, a total thickness of about 200 nm (ITO : 100 nm, silica: 100 nm) was required to form an anti-static effective ($10^3$~$10^5$ $\Omega$/square) and optically effective anti-reflection coating. Experimental shows that wet coating process of conductive oxide materials such as ITO, ATO, IZO and AZO, etc. with a thickness above 100 nm impart low uniformity, high resistance, low transmittance and high cost due to the spin coating and dry baking from solution of those materials.

For a typical conductive oxide sputtering process, the thickness of the thin film is below 50 nm to reach the resistance of $10^2$~$10^3$ $\Omega$/square, and the uniformity of the thin film is less than 3% which is important for optically effectiveness in anti-reflection coating. On the other hand, for a wet process system, the hardness of coating is about 6H, and for a vacuum sputtering process, the hardness of coating is about 8~9H. The combination of vacuum sputtering process and wet process made a coating with the hardness of about 7–9H. The present invention is to provide the anti-reflection with anti-static layer system composing of basically five layers of oxide and metal materials deposited by PVD system and only one layer of silica deposits by wet process from a chemical solution. The design of vacuum sputtering process not only provides a high conductive ITO film in the CRT coating but also provide a light absorption layer to meet the requirement of transmission of flat CRT from 45% to 55%.

There is one adhesion layer to increase the adhesion between panel glass and metal layer, and two layer of diffusion barrier to prevent the interaction between ITO and wet chemical solution. The wet chemical coating process provides a good anti-smudge function than vacuum evaporation and/or sputtering. The present invention provided a high conductive anti-static process of anti-reflection coating and well control of light transmission , which can be applied on the CRT surface coating.

There are six layers, namely, a first, a second, a third, a fourth, a fifth, and a sixth layer in consecutive numerical order beginning with the layer nearest from the substrate for the present invention of anti-static/anti-reflection coating. Each layer was described in terms of physical thickness or optical thickness. The optical thickness is a mathematical product of layer thickness and its refractive index. It is described as a fraction of a designed wavelength. In the present invention the designed wavelength is about 520 nm.

The first or the innermost layer is an oxide material. The oxide layer, preferably $SiO_2$, substantially being non-absorption for visible light, has a refractive index between 1.45 to 1.50 at a wavelength of about 520 nanometer (nm) and a physical thickness of between 10 nm to 30 nm at the design wavelength.

The second layer comprises metals selected from a group consisting of Ni, Cr, Ti, V, Co and ss (stainless steel) and a mixture of these metals. The second layer has a refractive index between 1.5 and 4.0.

The third layer is a transparent conductive oxide material. The conductive oxide layer, preferably ITO, substantially being little absorption for visible light, has a refractive index between 1.85 to 2.1 at a wavelength of about 520 nanometer (nm) and an optical thickness of about one sixth to one tenth wave length at the design wavelength.

The fourth layer is an oxide material. The oxide layer, preferably $Cr_2O_3$, substantially being little absorption for visible light, has a refractive index between 2.0 to 2.5 at a wavelength of about 520 nanometer (nm) and a physical thickness of between 10 nm to 30 nm at the design wavelength.

The fifth layer is also an oxide material. The oxide layer, preferably $SiO_2$, substantially being non-absorption for visible light, has a refractive index between 1.45 to 1.50 at a wavelength of about 520 nanometer (nm) and a physical thickness of between 10 nm to 30 nm at the design wavelength. The sixth layer is the same as the first and fifth layers, but the first and fifth layers material is coated by sputtering method and the sixth layer is prepared by wet process from TEOS solution. The material commonly is called silica. This layer has a refractive index between 1.45 to 1.55 and an optical thickness of about one fourth wave length at the design wavelength.

In the preferred embodiment, the six layers coating includes a first layer of $SiO_2$ having a thickness about 20 nm. A second layer of Cr has a thickness about 3 nm. A third layer of ITO has a thickness about 35 nm. A fourth layer of $Cr_2O_3$ has a thickness about 20 nm. A fifth layer of $SiO_2$ has a thickness about 20 nm, and a sixth layer is a layer of silica having a thickness about 80 nm.

The stated objects are achieved by the invention, a low resistance between $10^2$ Ω/squarer~$10^3$ Ω/square can be obtained from the ITO coating, and a low reflection spectrum can be obtained on the CRT sdbstrate in the visible light range from 400 nm to 700 nm. The total reflection is below 0.5% and the light transmission is between 45% to 55% from 400 nm to 700 nm in this 6 layers optical coating. It is demonstrated that the process is simple, reliable, easy control and economically. It has become possible in this way to produce an extremely low resistance, high hardness and low reflectance anti-reflection coating. Of particular advantage, a batch or in-line sputtering system was suggested to deposit the first, second, third, fourth and fifth layer of the present invention for low resistance, high optical performance, high scratch resistance, and free control of transmission. A wet coating process system was suggested to deposit the sixth layer of silica for low surface energy and low cost manufacturing.

On the other hand, the layer system of this invention is of high conductive for EMI (Electromagnetic Interference) shielding, extremely low reflection for optical view, well control of transmission from 45% to 55%, high scratch resistance for surface hardness, low surface energy for anti-smudge and low cost for manufacturing. For instance, a six layer anti-reflection and anti-static coating on CRT glass substrate according to the combination process of sputtering and wet process is described in this embodiment. The layer system has a low resistance between $10^2$ Ω/square to $10^3$ Ω/square to pass the certification of TCO 99, the layer system has the transmission from 45% to 55% for clear image panel glass, the layer system is hard enough to pass the scratch test of military standard MIL-C-48497 or MIL-C-675 and the optical quality is good enough to achieve the low reflection of CRT surface.

Thereby, a DC, AC or RF magnetron sputtering can be provided to deposit the first, second, third, fourth and fifth layers from Si, Cr, ITO, Cr and Si targets in the presence of a sputter gas of mixture Ar and $O_2$, under a given pressure of approximately 3 m Torr (m=mili=0.001). For the sixth layer, it is proposed that by using wet process method such as spin coating or spray coating from a TEOS solution in the presence of coating under a temperature of 33° C. and baking condition of 180° C.~200° C./30 min.

The various objects and advantages of the present invention will be more readily understood from the following detailed description when read in conjunction with the appended drawing, in which:

DESCRIPTION OF THE PREFERRED EMBODIMENTS

The stated objects are achieved by the invention, a low resistance, low reflectance and 45%~55% transmission can be obtain on CRT substrate in a visible light range from 400 nm to 700 nm by coating six layers with sputtering and wet coating process. The multi-layer structure are numbered in sequence beginning from the innermost layer i.e. the layer first from a substrate surface on which the thin films is deposited. Layers thickness values are specified as either a physical thickness in nm or as an optical thickness as some fraction or multiple of a wavelength of visible light. The typical value is 520 nm.

Figure 1:
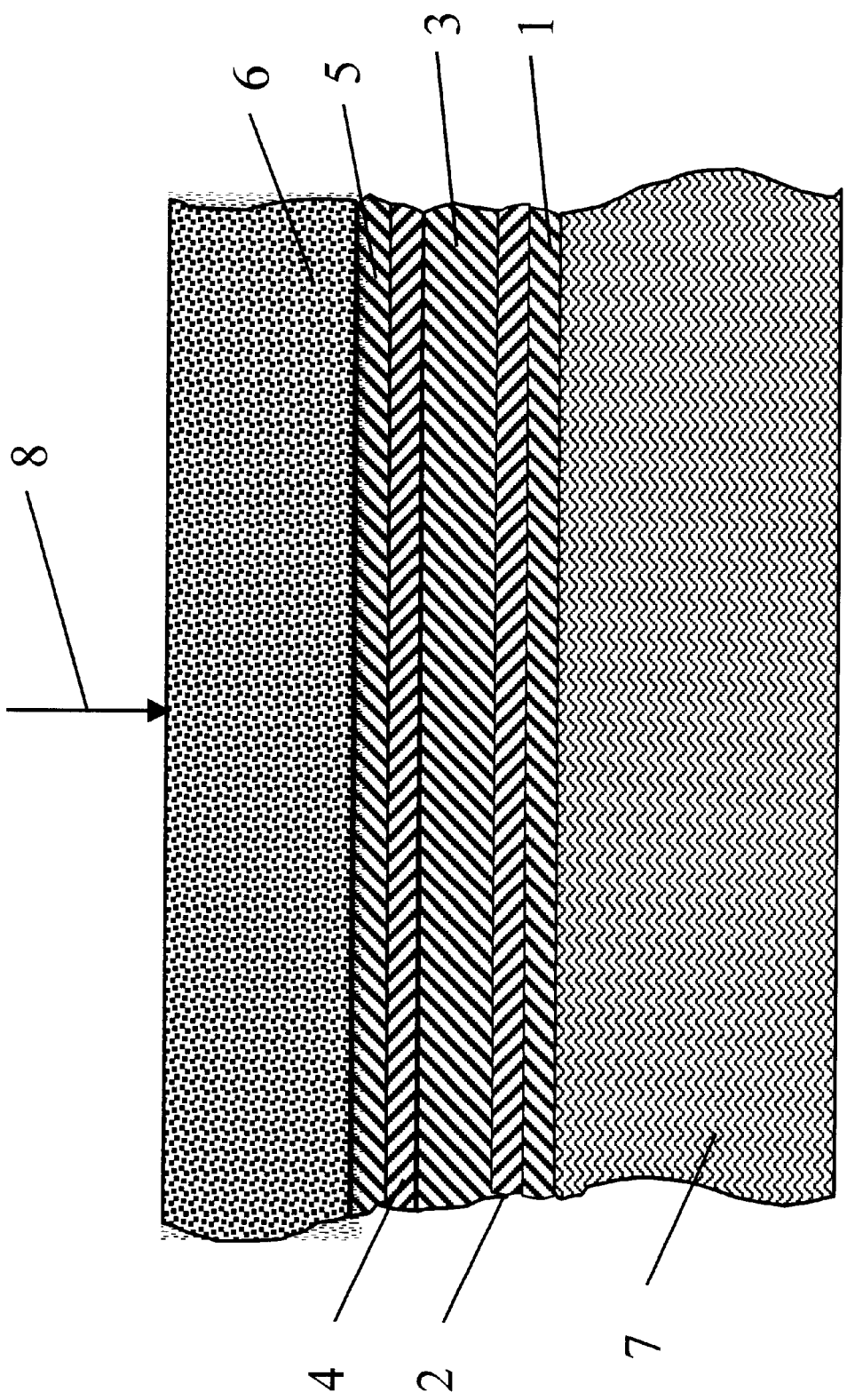
FIG. 1 schematically shows a cross sectional view of a layer system according to the present invention.

The layer structure of a preferred embodiment of the present invention is shown in FIG. 1. A substrate 7 can be a CRT glass, or another see-through materials. The direction of viewing is indicated by arrow 8. A layer 1, which is contacted in the front side of the substrate 7, is called a first layer 1. In the direction to the observer follows the second layer 2 being arranged on the first layer 1, which is next to the front surface of the substrate. The third layer 3 of the six layers is arranged on second layer 2. The fourth layer 4 of the six layers is arranged on third layer 3. The fifth layer 5 of the six layers is arranged on fourth layer 4. The sisth layer, or the outermost layer 6 is arrange on the fifth layer 5. The layers 1,2,3,4,5 and 6 form a layer system of the present invention.

In the present invention sample, the first layer is silicon dioxide ($SiO_2$) with a thickness of 20 nm. The silicon dioxide has a refraction index of about 1.46 at a wavelength of about 520 nm. The $SiO_2$ is proposed as an adhesion enhance layer to increase the adhesion between panel glass substrate, layer 7, and second layer 2. The second layer 2 of the layer system is a Cr layer with a thickness about 3 nm. The Cr metal is proposed as a light-attenuation layer for transmission control. The third layer is indium tin oxide (ITO) with a thickness of 35 nm. It has a refractive index of about 1.98 at a wavelength of about 520 nm. It is the major electron-conductive layer. The fourth layer is Cr oxide with a thickness of 20 nm. The Cr dioxide has a refraction index of about 2.3 at a wavelength of about 520 nm. The fifth layer 5 of the layer system is a $SiO_2$ layer with a thickness of 20 nm. The silicon dioxide has a refraction index of about 1.46 at a wavelength of about 520 nm. The $Cr_2O_3$ and $SiO_2$ are proposed as a diffusion barrier to prevent the interaction of ITO and wet chemical from the wet process. The sixth layer is silica with a thickness of 80 nm. The sixth layer has a refractive index of about 1.46–1.5 at a wavelength of about 520 nm. It was the only one layer material that coated by wet process from TEOS solution in atmosphere. The other layers of 1,2,3,4 and 5 were coated by sputtering process in vacuum system. In this invention, the optical performance of the layer system is a wide band low reflection coating.

Figure 2:
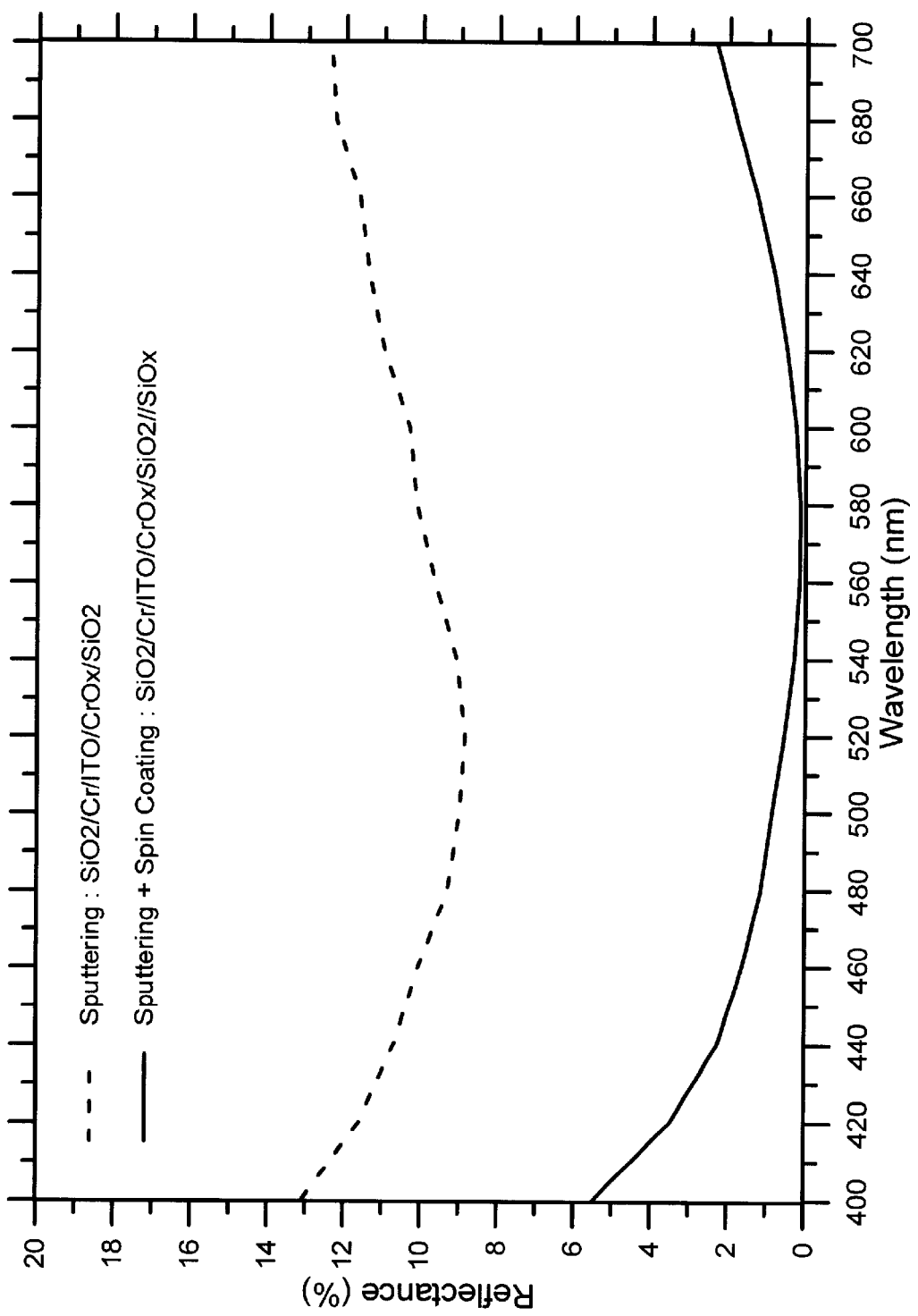
FIG. 2 shows the measured reflection curve in percent versus wavelength in nm of a layer system according to the present invention.

FIG. 2. shows the real reflection spectrum for the layer system of this invention. The reflection was measured in percent at the front surface of the CRT glass. The visible spectrum is from a wavelength of 400 nm to a wavelength of 700 nm. The dot-line curve reveals the reflection of layer 1, 2, 3, 4 and 5 that are coated by sputtering system. The curve line of the six layer system reveals clearly that the reflection in the core wavelength region of the light particularly between 520 and 630 nm is extra ordinarily low 0.5% and the reflection is below 5.5% in any wavelength range 400 nm to 700 nm. The optical performance is a low reflection wide band coating and the photopic reflectance is below 0.5% in the wavelength range from 400 nm to 700 nm. The resistance of the layer system is about $1.8\sim2.3\times10^2$ $\Omega$/square, the transmission of the layer system is about 52%, and the pencil hardness is more than 7H. Table 1. and Table 2 shows all the data of reflection from 400 nm to 700 nm, resistance, pencil hardness, CIE color, transmittance and etc.

Figure 3:
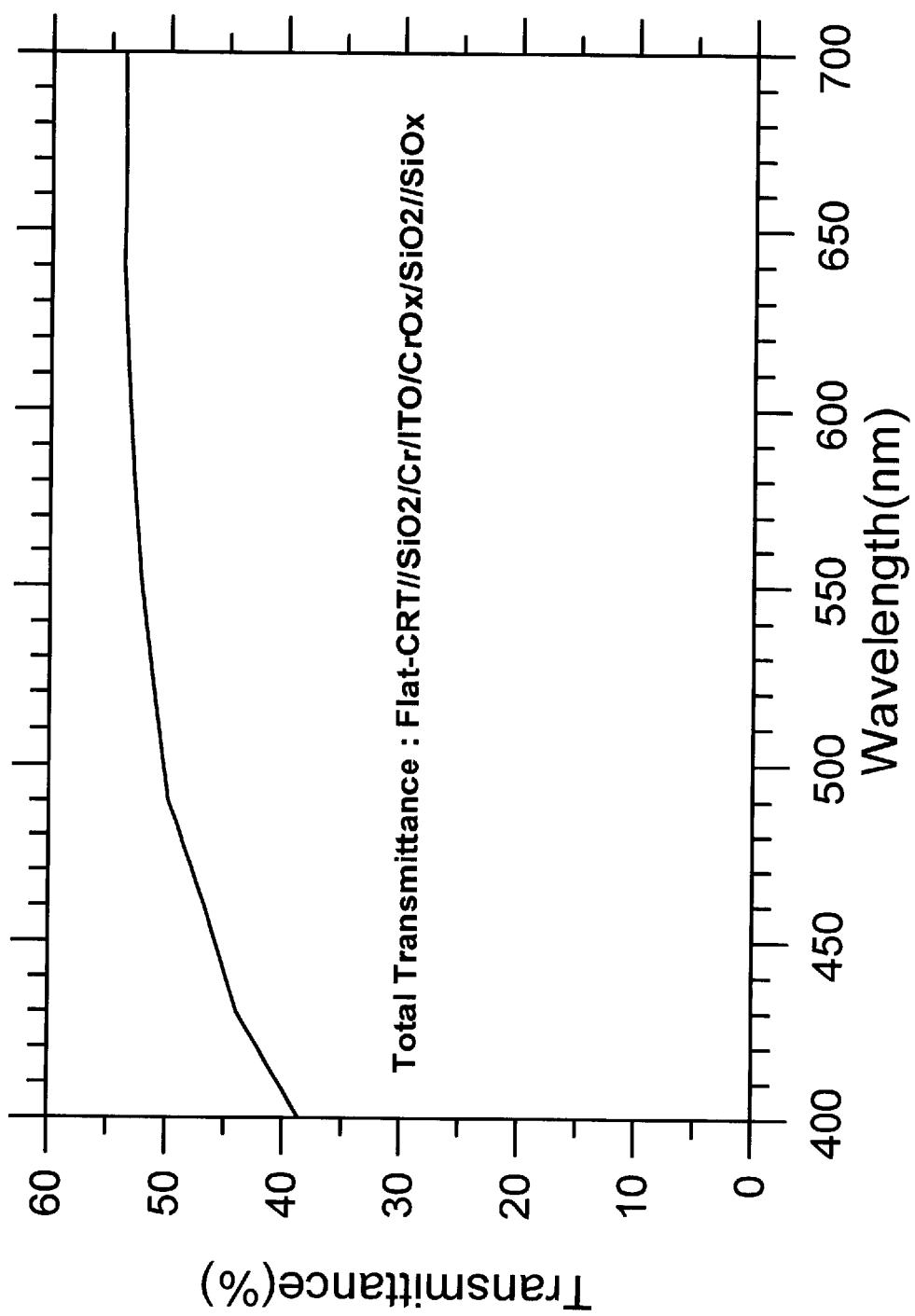
FIG. 3 shows the measured transmission curve in percent versus wavelength in nm of a layer system according to the present invention.

FIG. 3. shows the real transmission spectrum for the layer system of this invention. The transmission was measured in percent from the panel of the CRT glass.

The sputtering of oxide layer 1, 3, 4 and 5 is performed with a magnetron cathode in a reactive gas atmosphere composed of a gas mixture of Ar and $O_2$. The sputtering of metal Cr layer 2 was sputtered with a magnetron cathode in Ar gas only. The target materials for layer 1, 2, 3, 4 and 5 were Si, Cr, ITO, Cr and Si, respectively. The target to substrate distance was about 15 cm. No heating device was applied during sputtering process. The silica layer 6 was coated with TEOS chemical solution by spin coating at the 33° C. substrate temperature then baking at the temperature of 180 ° C.~200° C./30 min in atmosphere. All the working condition during sputtering and spin coating were described as table 3.

The following advantages are achieved in the invention:

The conventional wet process coating of anti-static and anti-reflection for CRT is difficult to be successful the certification of TC099, the film thickness and quality are very sensitive to temperature, it will rising many problems including resistance, optical effective and etc. The cost of chemical solution for low resistance wet coating process is very high and difficult to reach the order of $10^2$ $\Omega$/square. The present invention provided a six layer system which include sputtering of five layers and wet process coating of one oxide layer. In this optical layer system, the thickness of first, second, third, fourth and fifth layers are 20, 3, 35, 20 and 20 nm, respectively. The thickness of sixth layer of silica is about 80 nm. Because of the vacuum sputtering of conductive layer the resistance of the layer system in the present invention is low enough to reach $10^2$ $\Omega$/square. The second layer of Cr is a light-attenuation layer, it will freely control the transmission to reach 45%~55% in the optical layer system. The fourth layer and the fifth layer are also deposited by sputtering, it can be used as a diffusion barrier to prevent the interaction of ITO and wet chemical from the wet process. The sixth layer of silica is coated by wet process, it is an conventional process with low cost and low surface energy. Of particular interest, the resistance of the layer system is about $2\times10^2$ $\Omega$/square, the reflection is below 5.5% in the wavelength range from 400 nm to 700 nm, the photopic reflectance of the whole spectrum is below 0.5%, and the finger print free by low surface energy from the combination of wet chemical process. It is a high performance of conductivity for CRT application.

Although various minor modification may be suggested by those versed in the art, it should be understood that we wish to embody within the scope of the patent granted hereon all such modifications as reasonably and properly come within the scope of our contribution to the art.

TABLE 1

| Min. reflectance | Bottom wavelength | Resistance | Pencil Hardness | CIE color (x,y) | Transmittance (T %) |
|---|---|---|---|---|---|
| 0.14% (V-band or W-band) | 520~630 nm | 1.8~2.3 × 10$^2$ $\Omega$/□ | 7H~9H | (0.2020, 0.1428) | 52.14% |

TABLE 2

| | Reflection (percent) | |
|---|---|---|
| Wavelength (nm) | Sputtering Coating Flat-CRT//SiO$_2$/Cr/ITO/CrO$_x$/SiO$_2$ | Sputtering + Wet Coating Flat-CRT//SiO$_2$/Cr/ITO/CrO$_x$/SiO$_2$//SiO$_x$ |
| 400 | 13.10 | 5.50 |
| 420 | 11.59 | 3.49 |
| 440 | 10.69 | 2.27 |
| 460 | 10.06 | 1.63 |
| 480 | 9.30 | 1.14 |
| 500 | 9.00 | 0.85 |
| 520 | 8.86 | 0.54 |
| 540 | 9.09 | 0.29 |
| 560 | 9.65 | 0.15 |
| 580 | 10.13 | 0.14 |
| 600 | 10.33 | 0.25 |
| 620 | 11.00 | 0.50 |
| 640 | 11.40 | 0.83 |
| 660 | 11.65 | 1.28 |
| 680 | 12.29 | 1.83 |
| 700 | 12.41 | 2.36 |

TABLE 3

| | Material | Thickness | Coating method | Raw material | Coating condition |
|---|---|---|---|---|---|
| layer 1 | SiO$_2$ | 10~30 nm | Sputtering | Si | 3 m Torr |
| layer 2 | Cr | 2~4 nm | Sputtering | Cr | 3 m Torr |
| layer 3 | ITO | 30~50 nm | Sputtering | ITO | 3 m Torr |
| layer 4 | CrO$_x$ | 10~30 nm | Sputtering | Cr | 3 m Torr |
| layer 5 | SiO$_2$ | 10~25 nm | Sputtering | Si | 3 m Torr |
| layer 6 | Silica | 70~90 nm | Spin coating from sol-gel | TEOS | Coating temperature: 33° C. Baking Temperature: 180~200° C./ 30 min |

We claim:

1. An anti-reflection high conductivity multi-layer coating for Flat CRT products comprising six layers designated as a first, a second, a third, a fourth, a fifth, and a sixth layer in a consecutive numerical order beginning with a layer nearest from a substrate;

said first layer being arranged under the second layer and comprising a good adhesion with glass substrate oxide material having a refractive index within 1.45 to 1.55 at a wavelength of 520 nm, the layer having a physical thickness of 10–30 nm, and the layer being produced by vacuum sputtering process, said second layer being arranged on the first layer and comprising a metal having a refractive index within the approximating range of 1.5 to 4.0 at a wavelength of 520 nm, the layer having a physical thickness of 1–5 nm, and the layer being produced by vacuum sputtering process;

said third layer being arranged on the second layer and comprising an conductive oxide material having a refractive index between 1.85 to 2.1 at a wavelength of 520 nm, the layer having a physical thickness of 20–60 nm, and the layer being produced by vacuum sputtering process;

said fourth layer being arranged on the third layer and comprising a high chemical resistance oxide material having a refractive index within 2.0 to 2.5 at a wavelength of 520 nm, the layer having a physical thickness of 10–40 nm, and the layer being produced by vacuum sputtering process, said fifth layer being arranged on the fourth layer and comprising a good adhesion and high chemical resistance oxide material having a refractive index within 1.45 to 1.55 at a wavelength of 520 nm, the layer having a physical thickness of 10–30 nm, and the layer is produced by vacuum sputtering process, and said the sixth layer being arranged on the fifth layer and comprising an oxide material having a refractive index within 1.45 to 1.55 at a wavelength of 520 nm, the layer having a physical thickness of 60–120 nm, and the layer is produced by wet process.

2. The anti-reflection high conductivity multi-layer coating of claim 1, wherein said substrate is CRT.

3. The anti-reflection high conductivity multi-layer coating of claim 1, wherein said substrate is glass.

4. The anti-reflection high conductivity multi-layer coating of claim 1, wherein the first layer is $SiO_2$, said second layer is Cr, said third layer is ITO, said fourth layer is CrOx, said fifth layer is $SiO_2$, and sixth layer is silica.

5. The anti-reflection high conductivity multi-layer coating of claim 1, wherein the first layer comprises oxides selected from the group consisting of $SiO_2$ and SiAl-Oxide.

6. The anti-reflection high conductivity multi-layer coating of claim 1, wherein the second layer comprises metal selected from the group consisting of Cr, Ni, V, Ti, Co, Ta, and mixtures of thes metals.

7. The anti-reflection high conductivity multi-layer coating of claim 1, wherein the third layer comprises conductive oxides selected from the group consisting of ITO, IZO and ATO.

8. The anti-reflection high conductivity multi-layer coating of claim 1, wherein the fourth layer comprises oxides selected from the group consisting of CrOx, CuOx, TiN, TaN, ZrN, and NbN.

9. The anti-reflection high conductivity multi-layer coating of claim 1, wherein the fifth layer comprises oxides selected from the group consisting of $SiO_2$ and SiAl-Oxide.

10. The anti-reflection high conductivity multi-layer coating of claim 1, wherein the sixth layer comprises oxides selected from the group consisting of $SiO_2$, SiAl-Oxide and SiO compound.

11. The anti-reflection high conductivity multi-layer coating of claim 1, wherein the layers are applied by a combination process selected from the two groups consisting of a vacuum coating and wet process coating, the vacuum coating consisting of an evaporation or sputtering manufacturing process in either a batch or an in-line system; the wet process coating consisting of a spin coating or spray coating or sol-gel or slurry in either a batch or an in-line system.

* * * * *